United States Patent [19]

Oya et al.

[11] Patent Number: 6,153,276
[45] Date of Patent: *Nov. 28, 2000

[54] HEAT-SEALABLE LACTIC ACID-BASED POLYMER LAMINATES

[75] Inventors: Satoshi Oya; Akio Toyoda; Kousuke Arai, all of Chiba, Japan

[73] Assignee: Dainippon Ink and Chemicals, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/082,318

[22] Filed: May 21, 1998

[51] Int. Cl.[7] .......................... B32B 27/00; B32B 27/42; B65D 30/08
[52] U.S. Cl. .................. 428/35.2; 428/35.7; 428/411.1; 428/532; 383/109
[58] Field of Search ................................. 428/35.7, 35.2, 428/532, 903.3, 327, 332, 339, 347, 34.9; 528/354; 383/1, 109

[56] References Cited

U.S. PATENT DOCUMENTS 5,691,424 11/1997 Suzuki et al. ........................... 525/411
5,849,374 12/1998 Gruber et al. ......................... 428/34.3

OTHER PUBLICATIONS

Polymer Science Dictionary, Second Edition, Edited by Mark Alger, p. 515, Jan. 1997.

*Primary Examiner*—Ellis Robinson
*Assistant Examiner*—John J. Figueroa
*Attorney, Agent, or Firm*—Armstrong, Westerman, Hattori, McLeland & Naughton

[57] ABSTRACT

Disclosed is a heat-sealable lactic acid-based polymer laminates which have heat resistance of 60° C. or above, high sealing strength and good biodegradability and are useful in various films, sheets, packaging containers, etc., comprising a base layer (I) made of a crystallized lactic acid-based polymer (A) and a sealing layer (II) made of an amorphous lactic acid-based polymer (B) having a softening point lower than the melting point of said lactic acid-based polymer (A), and films, sheets or packaging containers with the use of these laminates.

13 Claims, No Drawings

HEAT-SEALABLE LACTIC ACID-BASED POLYMER LAMINATES

FIELD OF THE INVENTION

This invention relates to lactic acid-based polymer. laminates excellent in heat-sealing properties, heat resistance and biodegradability; lactic acid-based polymer laminates formed by heat-sealing these laminates which are suitable for packaging or packing various foods, drinks, drugs, miscellaneous goods, etc.; and packaging containers such as packaging bags, cases and lightweight containers formed by thermoforming these laminates.

BACKGROUND OF THE INVENTION

In these years, there have been used an extremely large amount of plastics the waste of which has induced global environmental problems, for example, short of lands for filling-up, worsened views, threat to marine organisms and environmental pollution. The so-called "commonly employed resins" include polyethylene, plypropylene, polystyrene, polyvinyl chloride, polyethylene terephthalate, etc. These resins have been disposed by incineration or filling-up.

However, these disposal treatments suffer from some problems. When resins such as polyethylene, polypropylene and polystyrene are incinerated, incinerators are frequently damaged due to high incineration calory thereof and thus become useless within a short period of time. Although polyvinyl chloride has a low incineration calory, it is known to liberate a harmful gas when burnt. When filled-up, these commonly employed resins are not degraded but remain as such semipermanently owing to the high chemical stability, which results in the serious shortage of lands for filling-up.

When these resins are carelessly thrown away in nature, they damage the beauties of nature because of the high chemical stability. Moreover, they bring about the death of marine organism, birds, etc. taking them by mistake, thus reducing the valuable biological resource. That is to say, the disposal of these plastics is one of the causes of the environmental pollution. To solve these problems, studies have been vigorously made on biodegradable polymers. These biodegradable polymers having been attracted public attention involve so-called "lactic acid-based polymers", i.e., polylactic acid and copolymers thereof. Different from common plastics, these lactic acid-based polymers are completely degraded finally into water and carbon dioxide.

Further, these lactic acid-based polymers have low incineration calory and, therefore, never damage incinerators. Furthermore, they liberate no harmful gas when burnt. Moreover, they can be obtained from vegetable materials which can be easily reused. Thus, there arises no problem of drying up the petroleum resources. Accordingly, lactic acid-based polymers having these advantages are expected as useful substitutes for the commonly employed resins.

There have been employed films and sheets produced by processing paper and synthetic resins and aluminum foils in packaging or packing various foods, drinks, drugs, miscellaneous goods, etc. in liquid, powdery or solid forms. In particular, films and sheets are employed packaging or packing bags, cases or thermoformed lightweight containers for various purposes, since they have a number of favorable characteristics such as high waterproofness, transparency, strength and thermoforming properties and low cost. It is required that these packaging or packing materials have, in particular, good heat-sealing properties and high heat resistance.

Films and sheets made of synthetic resins are processed into various bags and cases by folding and adhering at least one side thereof by taking advantage of the heat-sealing properties of the resins. Also, films and sheets are formed into lightweight containers, in which foods, drinks, drugs, miscellaneous goods, etc. are packed with the use of the rigidity of the contents, by various thermoforming methods such as vacuum forming, vacuum pressure forming, hot plate pressure forming and deep drawing vacuum forming.

After packing with the contents, these containers are often sealed at the opening by adhering films, sheets or lids formed by thermoforming these films, sheets, etc. That is to say, synthetic resin films and sheets are processed by various methods by taking advantage of the heat-sealing properties thereof and put into practical uses. In these cases, the adhesion power and appearance of the heat-sealed parts are important factors.

When the heat resistance during storage and transportation is taken into consideration, it is necessary that these containers, films and sheets are durable to high temperatures of at least 60° C. in usual. On the other hand, lightweight containers in which heated contents such as hot foods are to be packed (for example, food packs for rice, fried foods, prepared foods, etc., hot-fill containers for jam, pudding, jelly, etc.) should be resistant to high temperatures of 80° C. or above. In addition, these containers should be heat-sealable, since they are sealed after putting the contents thereinto.

To solve the problem of heat resistance, U.S. Pat. No. 5,076,983 discloses a method for elevating the heat resistance which comprises thermosetting a polylactic acid stretch film at 130° C. for 1 minute to thereby reduce its degree of shrinkage in boiling water from 66% to 4%. However, this method suffers from a problem that this film cannot be heat-sealed since it has been already crystallized.

SUMMARY OF THE INVENTION

An object of the present invention is to provide lactic acid-based polymer laminates which have heat resistance of 60° C. or above, high sealing strength and good biodegradability and are useful in various films, sheets, packaging containers, etc.

To achieve the above-mentioned object, the present inventors have conducted extensive studies. As a result, they have successfully found out that a heat-sealable lactic acid-based polymer laminate having good heat resistance can be obtained by using a lactic acid-based polymer laminate having a base layer (I) made of a crystallized lactic acid-based polymer (A) and a sealing layer (II) made of an amorphous lactic acid-based polymer (B) having a softening point lower than that of said lactic acid-based polymer (A), thus completing the present invention.

Accordingly, the present invention encompasses:

(1) a heat-sealable lactic acid-based polymer laminate having a base layer (I) made of a crystallized lactic acid-based polymer (A) and a sealing layer (II) made of an amorphous lactic acid-based polymer (B) having a softening point lower than the melting point of said lactic acid-based polymer (A);

(2) the lactic acid-based polymer laminate as described in the above (1), wherein said lactic acid-based polymer (A) is a lactic acid-based polymer having a melting point of 120° C. of higher;

(3) the lactic acid-based polymer laminate as described in the above (2), wherein said lactic acid-based polymer (A) is a lactic acid-based polymer containing from 3 to 60% by weight of a polyester structural unit formed by dehydrating/condensing a dicarboxylic acid with a diol and/or a polyether structural unit formed by dehydrating/condensing a dicarboxylic acid with a polyether polyol;

(4) the lactic acid-based polymer laminate as described in the above (2) or (3), wherein said lactic acid-based polymer (A) is a lactic acid-based polymer having a lactic acid component content of 40% by weight or more;

(5) the lactic acid-based polymer laminate as described in the above (2), wherein said lactic acid-based polymer (A) is polylactic acid;

(6) the lactic acid-based polymer as described in any one of the above (1) to (5), wherein said lactic acid-based polymer (B) is a lactic acid-based polymer having a softening point of from 40 to 110° C.;

(7) the lactic acid-based polymer laminate as described in any one of the above (1) to (5), wherein said lactic acid-based polymer (A) and/or said lactic acid-based polymer (B) comprise lactic acid-based polymer(s) obtained by deactivating a polymerization catalyst with a polymerization catalyst deactivator and/or lactic acid-based polymer(s) obtained by reducing the residual monomers by devolatilization and/or reprecipitation;

(8) the lactic acid-based polymer laminate as described in the above (1), wherein said lactic acid-based polymer (B) is a lactic acid-based polymer having a softening point of from 40 to 110° C. and said lactic acid-based polymer (A) and/or said lactic acid-based polymer (B) comprise lactic acid-based polymer(s) obtained by deactivating a polymerization catalyst with a polymerization catalyst deactivator and/or lactic acid-based polymer(s) obtained by reducing the residual monomers by devolatilization and/or reprecipitation;

(9) the lactic acid-based polymer laminate as described in any one of the above (1) to (8), wherein said base layer (I) made of said lactic acid-based polymer (A) is one having been crystallized by thermosetting;

(10) the lactic acid-based polymer laminate as described in any one of the above (1) to (8), wherein said base layer (I) made of said lactic acid-based polymer (A) is one having been oriented by stretching at a draw ratio of from 1.4 to 16;

(11) the lactic acid-based polymer laminate as described in any one of the above (1) to (8), which has the minimum storage modulus (E') of from 400 to 40,000 kgf/cm$^2$ at a temperature lower by 20° C. than its melting point in the test on the temperature dependency of dynamic viscoelasticity (JIS-K-7198, Method A);

(12) films or sheets comprising the lactic acid-based polymer laminate as described in any one of the above (1) to (8); and

(13) packaging containers comprising the lactic acid-based polymer laminate as described in any one of the above (1) to (8).

DETAILED DESCRIPTION OF THE INVENTION

The present invention provides heat-sealable lactic acid-based polymer laminates having a base layer (I) made of a crystallized lactic acid-based polymer (A) and a sealing layer (II) made of an amorphous lactic acid-based polymer (B) having a softening point lower than the melting point of said lactic acid-based polymer (A); films and sheets made of these laminates; and packaging containers including bags and cases formed by thermoforming these laminates.

The base layer (I) made of a lactic acid-based polymer (A) of the present invention is a layer for ensuring good heat resistance and made of a crystallized lactic acid-based polymer. On the other hand, the sealing layer (II) made of an amorphous lactic acid-based polymer (B) is a layer for achieving heat-sealing by the method described above (heat-sealing, etc.) and made of an amorphous lactic acid-based polymer having a lower softening point than the melting point of the lactic acid-based polymer of the base layer (I).

The term "amorphous lactic acid-based polymer" as used herein means those showing no melting point peak in the method as specified in JIS-K-7121. As the lactic acid-based polymer (A) in the base layer (I) of the present invention, use is made of a crystallized lactic acid-based polymer having a melting point of from 120 to 300° C. to achieve good heat resistance and thermoforming properties. Lactic acid-based polymers satisfying these requirements are those composed of L- and D-lactic acid isomers, as the lactic acid component constituting the lactic acid-based polymer, at a ratio (L/D) of from 100/0 to 97/3, or from 3/97 to 0/100 by mol.

The lactic acid-based polymer (A) is one containing from 3 to 60% by weight of a polyester structural unit formed by dehydrating/condensing a dicarboxylic acid with a diol and/or a polyether structural unit formed by dehydrating/condensing a dicarboxylic acid with a polyether polyol. The weight-average molecular weight of this lactic acid-based polymer (A) preferably ranges from 10,000 to 500,000.

To ensure favorable heat-sealing properties, the amorphous lactic acid-based polymer (B) to be used in the sealing layer (II) is one having a softening point of from 40 to 110° C., preferably from 40 to 100° C. This lactic acid-based polymer is composed of L- and D-lactic acid isomers, as the lactic acid component constituting the lactic acid-based polymer, at a ratio (L/D) of from 95.5/4.5 to 4.5/95.5, preferably from 93/7 to 7/93 by mol. When the balance between the heat resistance and the sealing properties of the lactic acid-based polymer laminate is taken into consideration, it is preferable that the melting point of the crystallized lactic acid-based polymer (A) differs from the softening point of the amorphous lactic acid-based polymer (B) by at least 20° C.

The polymers to be used in the present invention involve polylactic acid, lactic acid-based polymers containing lactic acid components, polyester components consisting of dicarboxylic acid components and diol components and/or polyether polyol components and mixtures thereof, each having a lactic acid component content of at least 40% by weight. The lactic acid components are exemplified by L, D and DL-lactic acid optical isomers, while the dicarboxylic acid components are exemplified by those carrying $C_{2-10}$ methylene chains such as adipic acid, sebacic acid and succinic acid.

The diol components are exemplified by those carrying $C_{2-6}$ main chains such as ethylene glycol, propylene glycol, butylene glycol, 1,4-butaneidol and 1,6-hexanediol. The polyether polyol components are exemplified by polyethylene glycol, polypropylene glycol and polybutylene glycol. Among all, it is particularly preferable to use adipic acid or sebacic acid as the dicarboxylic acid component, propylene glycol as the diol component, and polypropylene glycol as the polyether polyol component.

The most frequently employed method for producing polylactic acid comprises synthesizing lactide (i.e., a cyclic dimer) from lactic acid and then obtaining polylactic acid with a high molecular weight by ring-opening polymerization. Also, there has been employed another method wherein polylactic acid is synthesized directly from lactic acid via dehydration/condensation. On the other hand, copolymers which are lactic acid-based polymers are obtained by adding one or more side components (for example, aliphatic polyester, aromatic polyester, caplolactone, vinyl acetate, ethylene terephthalate polymer, ethylene vinyl alcohol) in the step of the polymerization of polylactic acid or immediately thereafter and then further proceeding the polymerization.

It is also possible to add molecular weight increasing agents(for example, polyvalent carboxylic acids, acid anhydrides thereof, polyvalent isocyanates) to thereby further elevate the molecular weight of the lactic acid-based polymer. Examples of the polyvalent carboxylic acids include trimellitic acid and pyromellitic acid. Examples of the acid anhydrides include succinic anhydride, trimellitic anhydride and pyromellitic anhydride. Examples of the polyvalent isocyanates include 2,4-tolylene diisocyanate, a mixture of 2,4-tolylene diisocyanate with 2,6-tolylene diisocyanate, diphenylmethane diisocyanate, 1,5-naphthalene diisocyanate, xylylene diisocyanate, xylylene diisocyanate hydride, hexamethylene diisocyanate, isophorone diisocyanate and triphenylmethane-4,4',4''-triisocyanate. Such a molecular weight increasing agent may be added at a ratio of from 0.01 to 5% by weight, based on the lactic acid-based polymer. Thus the weight-average molecular weight of the lactic acid-based polymer, which is usually about 300,000 at the largest, can be elevated to about 600,000 to 700,000.

Furthermore, the heat stability and storage stability of the polymer can be improved by adding chelating agents, acidic phosphates, etc. as a polymerization catalyst deactivator during or after the polymerization. The chelating agents can minimize the cleavage of the polymer chain. Use may be made of a mixture of organic chelating agents with inorganic chelating agents.

The acidic phosphates can enhance the stability through the following mechanism. Namely, such a phosphate forms a complex together with a metal ion in a catalyst contained in a composition consisting of a polyester composed of a dicarboxylic acid component with a diol component and a molecular weight increasing agent to thereby deactivate the activity, thus largely improving the heat stability and storage stability of the composition.

As the chelating agents, organic ones and inorganic ones are usable herein. Examples of the organic chelating agents include amino acids, phenols, hydroxycarboxylic acids, diketones, amines, oximes, phenanthrenes, pyridine compounds, dithio compounds, phenols including coordinated atom N, carboxylic acids including coordinated atom N, diazo compounds, thiols and porphyrins, though the present invention is not restricted thereto.

Such a chelating agent forms a complex together with a metal ion in a catalyst contained in a hydroxycarboxylic acid polyester composition to thereby deactivate the catalyst. Inorganic chelating agents should be handled with care, since they are highly hygroscopic and become less effective after absorbing moisture. Particular examples of the inorganic chelating agents include phosphoric acid, phosphorous acid, pyrophosphoric acid and polyphosphoric acid.

The amount of these organic or inorganic chelating agents to be added varies depending on the type thereof, the type and amount of the catalyst contained in the composition comprising the polyhydroxycarboxylic acid, the dicarboxylic acid component and the diol component, etc. In general, it is preferable to add such a chelating agent in an amount of from 0.001 to 5 parts by weight based on the whole composition comprising the polyhydroxycarboxylic acid, the dicarboxylic acid component and the diol component, or from 0.1 to 100 parts by weight per part by weight of the catalyst employed.

The term "acidic phosphates" means acidic phosphates, phosphonates, alkylphosphonic acids and mixtures thereof represented by the following general formula:

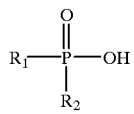

wherein $R_1$ represents an alkyl group or an alkoxyl group; and $R_2$ represents an alkyl group, an alkoxyl group or a hydroxyl group.

Among these acidic phosphates, acidic phosphate is particularly efficacious for deactivating a catalyst. The amount of the acidic phosphate to be added varies depending on the type thereof, the type of the catalyst employed and the kneading conditions. In general, it is preferable to add such a phosphate in an amount of from 0.001 to 5 parts by weight based on the whole composition comprising the polyhydroxycarboxylic acid, the dicarboxylic acid component and the diol component, or from 0.1 to 100 parts by weight per part by weight of the catalyst employed.

The lactic acid-based polymer (A) and/or lactic acid-based polymer (B) to be used in the present invention comprise lactic acid-based polymer(s) obtained by deactivating a polymerization catalyst with a polymerization catalyst deactivator and/or lactic acid-based polymer(s) obtained by reducing the residual monomers by devolatilization or reprecipitation.

That is to say, lactic acid-based polymers wherein a polymerization catalyst is deactivated with a polymerization catalyst deactivator after the completion of the polymerization of the lactic acid-based polymer and/or lactic acid-based polymers wherein the monomers and oligomers remaining in the polymers are reduced by devolatilization or reprecipitation contribute to the improvement in the heat-sealing properties.

In the lactic acid-based polymer (A) and/or the lactic acid-based polymer (B) to be used in the present invention, it is preferable that the content of the residual momoners and oligomers is reduced to 2% by weight or less, preferably 1% by weight or less and still preferably 0.1% by weight or less by devolatilization and/or reprecipitation. By reducing the residual monomers and oligomers, the storage stability can be enhanced and further depositing of the residual monomers and oligomers on cooling rolls and molding dies at the step of thermofoing can be prevented, thus preventing the molded articles from damages in the appearance.

As described above, the residual monomers and oligomers can be physically reduced by devolatizing the lactic acid-based polymers by heating under reduced pressure, other than the method of deactivating the polymerization catalysts with the use of deactivators. More particularly speaking, the devolatilization is performed by using a single- or twin-screw extruder, a film evaporator, a pot type pressure reducing device, etc.

To devolatize the lactic acid-based polymer, it is preferable, after the completion of the polymerization, the lactic acid-based polymer is taken out while heating under reduced pressure. To prevent the lactic acid-based polymer from a decrease in the molecular weight, it is preferable to perform devolatilization for 10 seconds to 10 minutes at 100 to 230° C. at a degree of vacuum of 0.1 to 50 Torr, still preferably 0.1 to 10 Torr and still preferably 0.1 to 5 Torr.

After the completion of the polymerization, the lactic acid-based polymer may be pelletized or powdered and then taken out while heating under reduced pressure. In this case, it is also preferable to prevent the lactic acid-based polymer from a decrease in the molecular weight by performing devolatilization for 2 to 400 minutes at 60 to 200° C. at a degree of vacuum of 0.1 to 50 Torr, still preferably 0.1 to 10 Torr and still preferably 0.1 to 5 Torr.

A similar devolatilization effect can be achieved by, after the completion of the polymerization, taking out the lactic acid-based polymer and processing it into films or sheets by thermoforming with the use of a single- or twin-screw extruder provided with a vent. In this case, it is also preferable to prevent the lactic acid-based polymer from a decrease in the molecular weight by performing devolatilization for 10 seconds to 10 minutes at 145 to 230° C. at a degree of vacuum of 0.1 to 50 Torr, still preferably 0.1 to 10 Torr and still preferably 0.1 to 5 Torr.

In the reprecipitation method, the lactic acid-based polymer is dissolved in a solvent, after the completion of the polymerization, and then added to a poor solvent to thereby give the lactic acid-based polymer. Examples of the solvent in which the lactic acid-based polymer is to be dissolved include benzene, toluene, ethylbenzene, xylene, cyclohexane, methyl ethyl ketone, methyl isobutyl ketone, tetrahydrofuran, dioxane, methyl isobutyl ketone, isopropyl ether, dichloromethane, chloroform, carbon tetrachloride, chlorobenzene, dichlorobenzene, trichlorobenzene and chloronaphthalene. Either one of these solvents or a mixture thereof may be used. Examples of the poor solvent include water, methanol, ethanol, propanol, butanol, pentane, octane, nonane, decane, diethyl ether and mixtures of the same.

The reprecipitation method is carried out as follows. First, the lactic acid-based polymer is dissolved in the solvent at room temperature or under heating to give a concentration of from 2 to 20% by weight. Next, the resultant solution is slowly added to the poor solvent 2 to 15 times as much under stirring. After allowing to stand for 10 to 180 minutes, the precipitate thus formed is taken up. From the precipitate, the remaining solvent is eliminated under reduced pressure optionally with heating.

To reduce the residual monomers and oligomers, the formation of the residual monomers and oligomers may be inhibited with the use of polymerization catalyst deactivators. Alternatively, the residual monomers and oligomers may be mechanically eliminated by devolatilization or reprecipitation. It is preferable to reduce the residual monomers and oligomers from the lactic acid-based polymers to be used in the present invention by any one of these methods. Alternatively, use may be made of lactic acid-based polymers which have been treated by combining these methods.

The term "laminate" as used herein means one in the form of a plate with a thickness of 5,000 μm or less. The lactic acid-based polymer laminates of the present invention may further contain, as the second and third components, other polymers and additives such as plasticizers, stabilizers, antioxidants, anti-blocking agents, anti-fogging agents and coloring agents. The polymers may contain aliphatic polyesters, polyvinyl alcohol, polyhydroxybutyrate hydroxyvalerate, starch polymers, etc.

As the additives, use may be made of polyester type plasticizers (1,3-butanediol, adipic acid, etc.), plasticizers (dioctyl phthalate, polyethylene glycol adipate, etc.), stabilizers (epoxidized soybean oil, carbodiimide, etc.), antioxidants [2,6-di-tert-butyl-4-methylphenol (BHT), butyl hydroxyanisole (BHA), etc.], anti-blocking agents (silica, talc, etc.), anti-fogging agents (glycerol fatty acid esters, monostearyl citrate, etc.), coloring agents (titanium oxide, carbon black, ultramarine, etc.), etc.

Examples of heat-sealing adhesion methods commonly employed in the art include heat-sealing, impulse sealing, fuse sealing, impulse fuse sealing, ultrasonic sealing and high-frequency sealing. Among all, heat-sealing, impulse sealing and fuse sealing are frequently employed in general. The lactic acid-based polymer laminate of the present invention consists of the base layer (I) and the sealing layer (II) laminated thereon. The most practically useful lamination method is the coextrusion film forming method with the use of two or more extruders. Alternatively, use may be made therefor of a method wherein the sealing layer (II) is laminated on the preliminarily formed base layer (I) by melt extrusion or another method wherein the base layer (I) and sealing layer (II) each preliminarily formed are laminated via an adhesive.

The base layer (I) may be metallized with a metal or a metal oxide or printed. It maybe subjected to two or more of these treatments. The thickness of the base layer (I) preferably ranges from 5 to 3,000 μm, still preferably from 5 to 200 μm from the viewpoints of strength and economic factors. It is further preferable that base layer (I) has such a thickness as to be called "a film", namely, from 5 to 100 μm.

The term "sheet" as used herein means one having a thickness exceeding 100 μm and not more than 3,000 μm. From the viewpoint of the film-forming properties, the thickness of the sealing layer (II) preferably ranges from 1 to 30 μm. When the sealing strength is taken into consideration, the thickness of the sealing layer preferably ranges from 2 to 20 μm, still preferably from 3 to 10 μm.

Next the method for forming lactic acid-based polymer films by extrusion and the conditions therefor will be described. Since lactic acid-based polymers are highly hygroscopic and hydrolyzable, the moisture conditions should be strictly regulated. When a lactic acid-based polymer film is formed with a commonly employed single screw extruder, the polymer should be dehydrated and dried with a vacuum drier, etc. prior to the film formation. By using a vent type twin screw extruder, a high dehydration effect can be achieved and, therefore, the drying step can be omitted, which enables efficient film formation.

The melt extrusion temperature in forming lactic acid-based polymer films usually ranges from 150 to 250° C., though the present invention is not restricted thereto. The melt-extruded sheet is casted to give a definite thickness and cooled, if desired. When the sheet is too thick, it is treated with a touch roll or an air knife. When it is too thin, on the other hand, it is thickened by electrostatic pinning. Thus a uniform sheet can be obtained in each case. In the melt extrusion, lips are arranged at intervals of from 0.2 to 3.0 mm, preferably from 0.2 to 1.5 mm from the viewpoint of film-forming properties.

Next, the lamination methods will be described in detail. To produce a lactic acid-based polymer laminate by the coextrusion film-forming method, first the base layer (I) and the sealing layer (II) are separately melt-kneaded by using respective extruders. Then these layers are laminated in a T-die or a feed block before it. Next, the laminate thus formed is passed through the T-die to form a film. The extrusion film formation is performed fundamentally in the same manner under the same conditions each as those described above.

When the base layer (I) does not well adhere to the sealing layer (II), it is required to put an adhesive layer (III) between them. As the resin therefor, use may be made of copolymers obtained by introducing specific functional groups into polyolefins, etc., butene-type copolymers, polyethyleneimine, modified cellulose, etc. The thickness of the adhesive layer (III) preferably ranges from 0.5 to 20 $\mu$m.

In the melt extrusion lamination method, the base layer (I) supplied from a feeder and the sealing layer (II) introduced from an extruder into a T-die are adhered in a laminator to give a laminate. The extrusion film formation of the sealing layer (II) is performed fundamentally in the same manner under the same conditions each as described above. When the base layer (I) does not well adhere to the sealing layer (II), the base layer (I) is subjected, prior to feeding into the laminator, to corona discharge treatment, flame plasma treatment, chemical etching treatment with chromic acid, etc., surface treatment with ozone, UV-light, etc., or surface irregularity treatment such as sandblasting, etc. to thereby improve the adhesiveness. Alternatively, an appropriate anchor coating is employed so as to improve the adhesiveness.

Methods for laminating the base layer (I) and the sealing layer (II), each preliminarily formed, include wet lamination, dry lamination, etc. In such a case, an adhesive is first applied onto the base layer (I) or the sealing layer (II) followed by lamination. Examples of the adhesive usable in the wet lamination include proteins (casein, gelatin, etc.), starch, carbohydrates (cellulose derivatives, etc.) and synthetic resins (vinyl acetate, acrylates, acryl-modified vinyl acetate, ethylene/vinyl acetate copolymer, etc.).

Examples of the adhesive usable in the dry lamination include one-solution reaction type adhesives carrying isocyanate introduced into the end of polymers (polyether polyurethane polyisocyanate, polyester polyurethane polyisocyanate, etc.) and two-solution reaction type urethane adhesives consisting of the main component carrying hydroxyl group such as polyester resins (polyester polyol, polyester polyurethane polyol, etc.) or polyether resins (polyether polyurethane polyol, etc.) with a hardener carrying isocyanate group which are to be mixed before using. These adhesives are preferably applied at a rate of from about 1 to 5 g/m$^2$.

The term "heat resistance" as used herein means the practical heat resistance. Namely, a film, a sheet or a processed product thereof sustains a specific elasticity while being neither damaged in its appearance nor deformed at the processing or using temperature. During transportation or storage, films, sheets or processed products thereof (bags, cases, lightweight containers, etc.) are usually kept in a tightly closed transportation containers or warehouses. When no air-conditioner is provided, these articles are exposed to a high environmental temperature of 50° C. or above, for example, in summer. Therefore, these articles should have a heat resistance of 60° C. or above.

To impart the desired heat resistance, the lactic acid-based polymer (A) to be used in the lactic acid-based polymer base layer (I) is crystallized. As a method for thermally crystallize the lactic acid-based polymer, the thermosetting method will be now illustrated. Either the base layer (I) with the use of the lactic acid-based polymer (A) alone or a laminate of the base layer (I) and the sealing layer (II) may be subjected to the thermosetting.

Although the thermosetting temperature and time are not particularly restricted, it is preferable to establish an adequate crystallization speed by controlling the thermosetting temperature within the range from the temperature lower by 40° C. than the crystallization temperature (Tc) of the lactic acid-based polymer (A) to the melting point (Tm) thereof. To achieve good surface state and a high heat resistance, it is particularly preferable that the thermosetting temperature falls within the range of the crystallization temperature (Tc) to the temperature higher by 40° C. than Tc.

When stretching is effected before or simultaneously with the thermosetting, the crystallization is accelerated and thus the heat resistance can be improved within a short heating time of 5 to 30 seconds. In this case, moreover, the crystallization proceeds in association with the orientation. Thus, the heat resistance can be improved while maintaining the high transparency of the lactic acid-based polymer.

The stretching is carried out by calendaring, lengthwise stretching, crosswise stretching, simultaneous biaxial stretching or successive biaxial stretching, though the present invention is not restricted thereto. Either the base layer (I) with the use of the lactic acid-based polymer (A) alone or a laminate of the base layer (I) and the sealing layer (II) may be subjected to the stretching.

In this step, the heating temperature preferably ranges from the glass transition temperature (Tg) of the base layer (I) to the melting point thereof, still preferably from the glass transition temperature to the temperature higher by 50° C. than Tg. Among all, it is preferable to effect the stretching at the temperature higher by 10 to 40° C. than the glass transition temperature (Tg) of the base layer (I), since good face conditions of the sheet can be thus achieved.

The draw ratio of the orientation preferably ranges from 1.4 to 16, still preferably from 2 to 15, since good face conditions and high transparency can be thus established.

The thermosetting may be performed by heating the polymer for a definite period of time in a forced air circulation or with the use of radiant heat from an infrared heater, etc., or bringing the polymer into contact with a hot plate, mold or roll for a certain period of time. Among all, a high productivity can be achieved by using an apparatus called "tenter" whereby a sheet or a film is continuously thermoset in forced air circulation under heating. Since this apparatus aims at stretching, the stretching and thermosetting can be completed within a short period of time thereby, thus establishing a high productivity. Thus, the lactic acid-based polymer laminate can be efficiently crystallized.

When the lactic acid-based polymer laminate is formed into lightweight containers, in which foods, drinks, drugs, miscellaneous goods, etc. are packed with the use of the rigidity of the contents, by various thermoforming methods such as vacuum forming and pressure forming, it is recommended to perform the thermosetting on the mold. In such a case, the thermosetting conditions (i.e., mold temperature and time) are selected from those specified above, though the present invention is not restricted thereto.

The lactic acid-based polymer laminate of the present invention has a heat resistance of 60° C. or above which brings about no problem in practical use at home. Also, it has the minimum storage modulus (E') of at least 400 kgf/cm$^2$ at a temperature lower by 20° C. than the melting point of the lactic acid-based polymer (A), when determined by the test on the temperature dependency of dynamic viscoelasticity (JIS-K-7198, Method A).

When the storage modulus (E') is less than 400 kgf/cm$^2$, no good elasticity can be obtained at 50 to 60° C. Accordingly, a container made of such a laminate cannot support the contents but undergoes deformation due to the weight of the contents therein. When the flexibility in using at ordinary temperature is also taken into consideration, it is preferable to regulate the storage modulus (E') to not more than 40,000 kgf/cm². To achieve a high heat resistance of 80° C. or above, it is still preferable to control the storage modulus (E') to 900 kgf/cm² or above.

This test on the temperature dependency of dynamic viscoelasticity is carried out by elevating temperature at 2° C./min. The glass transition temperature (Tg), crystallization temperature (Tc) and melting point (Tm) as used herein are respectively $T_{ig}$, $T_{pc}$ and $T_{pm}$ as specified in JIS-K-7121 which are determined by elevating temperature at 10° C./min. The term "amorphous lactic acid-based polymer" as used herein means those showing no melting point peak in JIS-K-7121. The softening point is measured in accordance with JIS-K-7206, Method A.

The heat-sealable lactic acid-based polymer laminate of the present invention, which has a base layer (I) made of a lactic acid-based polymer (A) and a sealing layer (II) made of an amorphous lactic acid-based polymer (B) having a softening point lower than the melting point of said lactic acid-based polymer (A), can show a high sealing strength, when the sealing layer (II) serves as the sealing face. Also, an efficacious sealing strength can be obtained when the base layer (I) and the sealing layer (II) each serves as the sealing face.

The heat-sealable lactic acid-based polymer laminates of the present invention are usable in packaging containers which should have general heat resistance. In particular, these laminates are suitable for producing packaging or packing bags, cases and thermoformed lightweight containers.

The term "packaging bags" as used herein means commonly employed bags made of synthetic resin films sealed by folding, adhering, etc. and having a two- or three-dimensional structure. These bags are usable in packaging foods (vegetables, confectionery, bread, etc.), miscellaneous goods, rice, fertilizers, etc. The lactic acid-based polymer laminates obtained in the present invention are usable as folded or heat-sealed bags for these purposes.

The term "cases" as used herein means three-dimensional packaging materials produced by processing sheets into boxes by folding or cylinders without folding and optionally adhering the end(s) by heat-sealing, etc. without resort to thermoforming such as vacuum forming or pressure forming. These cases are employed for packaging cosmetics, stationery, small-sized electrical apparatuses, miscellaneous goods, etc.

The term "cases" also involves two-dimensional ones for packaging documents, etc. which are formed by folding sheets and heat-sealing another end or heat-sealing two ends while remaining the residual two ends open. The lactic acid-based polymer laminates obtained herein are usable as folded or heat-sealed cases for various purposes.

The term "lightweight containers" means three-dimensional packaging materials produced by forming films or sheets by thermoforming methods such as vacuum forming and pressure forming. These lightweight containers are shaped into the body with lid, trays, food packs, blister packs, PTP packages, cups for liquid contents, etc. These lightweight containers are used in packaging solid foods (vegetables, meat, prepared foods, confectionery, bread, fried foods, etc.), gelatinous foods (jam, pudding, jelly, etc.), drinks (milk products, juice, etc.), drugs such as tablets, miscellaneous goods, etc.

The lactic acid-based polymer laminates obtained in the present invention have excellent heat sealing properties and practically available heat resistance and are appropriately usable in packaging materials for packaging or packing various foods, drinks, drugs, miscellaneous goods, etc., in particular, bags, cases and thermoformed lightweight containers.

EXAMPLES

To further illustrate the present invention in greater detail, and not by way of limitation, the following Examples will be given. Frist, methods for producing the lactic acid-based polymers employed herein will be described.
(Production of lactic acid-based polymer (A))
(Resin P1)

A mixture of 98% by mol of L-lactide with 2% by mol of D-lactide was stirred in an inert gas atmosphere at 165° C. for 1 hour. Next, 0.02 part by weight of tin octanoate was added thereto as an esterifying catalyst and the resultant mixture was reacted for 8 hours. After adding 0.04 part by weight of acidic phosphate as a deactivator, the mixture was kneaded. The lactic acid-based polymer (A) thus obtained was a colorless and transparent resin having a weight-average molecular weight of 192,000 (determined by GPC), a glass transition temperature (Tg) of 56° C., a crystallization temperature (Tc) of 110° C. and a melting point (Tm) of 163° C. This resin was referred to as P1.
(Resin P2)

L-Lactide was stirred in an inert gas atmosphere at 185° C. for 1 hour. Next, 0.02 part by weight of tin octanoate was added thereto as an esterifying catalyst and the resultant mixture was reacted for 8 hours. After adding 0.04 part by weight of acidic phosphate as a deactivator, the mixture was kneaded. The lactic acid-based polymer (A) thus obtained was a colorless and transparent resin having a weight-average molecular weight of 252,000 (determined by GPC), a glass transition temperature (Tg) of 59° C., a crystallization temperature (Tc) of 110° C. and a melting point (Tm) of 176° C. This resin was referred to as P2.
(Resin P3)

95 parts by weight of lactide (99% by mol of L-lactide with 1% by mol of D-lactide) was added to 5 parts by weight of an aliphatic polyester [weight-average molecular weight: 24,000 (in terms of polystyrene), 50% by mol of sebacic acid with 50% by mol of propylene glycol]. After replacing the atmosphere with an inert gas, the mixture was mixed at 170° C. for 1 hour. Next, 0.02 part by weight of tin octanoate was added thereto as an esterifying catalyst and the resultant mixture was reacted for 8 hours. After adding 0.04 part by weight of acidic phosphate as a deactivator, the mixture was kneaded. The lactic acid-based polymer (A) thus obtained was a colorless and transparent resin having a weight-average molecular weight of 203,000 (determined by GPC), a glass transition temperature (Tg) of 55° C., a crystallization temperature (Tc) of 108° C. and a melting point (Tm) of 168° C. This resin was referred to as P3.
(Resin P4)

80 parts by weight of lactide (97% by mol of L-lactide with 3% by mol of D-lactide) was added to 20 parts by weight of an aliphatic polyester [weight-average molecular weight: 35,000 (in terms of polystyrene), 50% by mol of sebacic acid with 50% by mol of 1,6-hexanediol]. After replacing the atmosphere with an inert gas, the mixture was mixed at 170° C. for 1 hour. Next, 0.02 part by weight of tin octanoate was added thereto as an esterifying catalyst and the resultant mixture was reacted for 8 hours. After adding 0.04 part by weight of acidic phosphate as a deactivator, the mixture was kneaded. The lactic acid-based polymer (A) thus obtained was a colorless and transparent resin having a weight-average molecular weight of 113,000 (determined by GPC), a glass transition temperature (Tg) of 49° C., a crystallization temperature (Tc) of 93° C. and a melting point (Tm) of 162° C. This resin was referred to as P4.

(Resin P5)

60 parts by weight of lactide (97% by mol of L-lactide with 3% by mol of D-lactide) was added to 40 parts by weight of an aliphatic polyester [weight-average molecular weight: 34,000 (in terms of polystyrene), 50% by mol of sebacic acid, 25% by mol of ethylene glycol with 25% by mol of 1,6-hexanediol]. After replacing the atmosphere with an inert gas, the mixture was mixed at 165° C. for 1 hour. Next, 0.02 part by weight of tin octanoate was added thereto as an esterifying catalyst and the resultant mixture was reacted for 8 hours. After adding 0.04 part by weight of acidic phosphate as a deactivator, the mixture was kneaded. The lactic acid-based polymer (A) thus obtained was a colorless and transparent resin having a weight-average molecular weight of 102,000 (determined by GPC), a glass transition temperature (Tg) of 51° C., a crystallization temperature (Tc) of 73° C. and a melting point (Tm) of 162° C. This resin was referred to as P5.

(Production of amorphous lactic acid-based polymer (B))

(Resin P6)

A mixture of 70% by mol of L-lactide with 30% by mol of D-lactide was stirred in an inert gas atmosphere at 165° C. for 1 hour. Next, 0.02 part by weight of tin octanoate was added thereto as an esterifying catalyst and the resultant mixture was reacted for 8 hours. After adding 0.04 part by weight of acidic phosphate as a deactivator, the mixture was kneaded. The lactic acid-based polymer (B) thus obtained was a colorless and transparent resin having a weight-average molecular weight of 272,000 (determined by GPC), a glass transition temperature (Tg) of 52° C. and no melting point (Tm). This resin was referred to as P6.

(Resin P7)

A mixture of 30% by mol of L-lactide with 70% by mol of D-lactide was stirred in an inert gas atmosphere at 165° C. for 1 hour. Next, 0.02 part by weight of tin octanoate was added thereto as an esterifying catalyst and the resultant mixture was reacted for 8 hours. After adding 0.04 part by weight of acidic phosphate as a deactivator, the mixture was kneaded. The lactic acid-based polymer (B) thus obtained was a colorless and transparent resin having a weight-average molecular weight of 167,000 (determined by GPC), a glass transition temperature (Tg) of 52° C. and no melting point (Tm). This resin was referred to as P7.

(Resin P8)

50 parts by weight of lactide (90% by mol of L-lactide with 10% by mol of D-lactide) was added to 50 parts by weight of an aliphatic polyester [weight-average molecular weight: 75,000 (in terms of polystyrene), 50% by mol of sebacic acid with 50% by mol of ethylene glycol] . After replacing the atmosphere with an inert gas, the mixture was mixed at 165° C. for 1 hour. Next, 0.02 part by weight of tin octanoate was added thereto as an esterifying catalyst and the resultant mixture was reacted for 8 hours. After adding 0.04 part by weight of acidic phosphate as a deactivator, the mixture was kneaded. The lactic acid-based polymer (B) thus obtained was a colorless and transparent resin having a weight-average molecular weight of 81,000 (determined by GPC), a glass transition temperature (Tg) of 46° C. and no melting point (Tm). This resin was referred to as P8.

(Resin P9)

95 parts by weight of lactide (95% by mol of L-lactide with 5% by mol of D-lactide) was added to 5 parts by weight of a polyester containing aromatic carboxylic acids and aliphatic dicarboxylic acids [weight-average molecular weight: 47,000 (in terms of polystyrene), 16% by mol of terephthalic acid, 14% by mol of isophthalic acid, 20% by mol of adipic acid, 23% by mol of ethylene glycol with 27% by mol of neopentyl glycol] . After replacing the atmosphere with an inert gas, the mixture was molten and mixed at 165° C. for 1 hour. Next, 0.02 part by weight of tin octanoate was added thereto as an esterifying catalyst and the resultant mixture was reacted for 6 hours. After adding 0.04 part by weight of acidic phosphate as a deactivator, the mixture was kneaded. The lactic acid-based polymer (B) thus obtained was a colorless and transparent resin having a weight-average molecular weight of 195,000, a glass transition temperature (Tg) of 57° C. and no melting point (Tm). This resin was referred to as P9.

(Resin 210)

A mixture of 70% by weight of L-lactide with 30% by weight of D-lactide was stirred in an inert gas atmosphere at 165° C. for 1 hour. Next, 0.02 part by weight of tin octanoate was added thereto as an esterifying catalyst and the resultant mixture was reacted for 8 hours. No deactivator was added thereafter. The lactic acid-based polymer (B) thus obtained was a colorless and transparent resin having a weight-average molecular weight of 272,000 (determined by GPC), a glass transition temperature (Tg) of 52° C. and no melting point (Tm). This resin was referred to as P10.

(Resin P11)

95 parts by weight of lactide (95% by mol of L-lactide with 5% by mol of D-lactide) was added to 5 parts by weight of a polyester containing aromatic carboxylic acids and aliphatic dicarboxylic acids [weight-average molecular weight: 47,000 (in terms of polystyrene), 16% by mol of terephthalic acid, 14% by mol of isophthalic acid, 20% by mol of adipic acid, 23% by mol of ethylene glycol with 27% by mol of neopentyl glycol] . After replacing the atmosphere with an inert gas, the mixture was molten and mixed at 165° C. for 1 hour. Next, 0.02 part by weight of tin octanoate was added thereto as an esterifying catalyst and the resultant mixture was reacted for 6 hours. No deactivator was added thereafter. The lactic acid-based polymer (B) thus obtained was a colorless and transparent resin having a weight-average molecular weight of 195,000, a glass transition temperature (Tg) of 57° C. and no melting point (Tm). This resin was referred to as P11.

(Resin P12)

95 parts by weight of lactide (95% by mol of L-lactide with 5% by mol of D-lactide) was added to 5 parts by weight of a polyester containing aromatic carboxylic acids and aliphatic dicarboxylic acids [weight-average molecular weight: 47,000 (in terms of polystyrene), 16% by mol of terephthalic acid, 14% by mol of isophthalic acid, 20% by mol of adipic acid, 23% by mol of ethylene glycol with 27% by mol of neopentyl glycol] . After replacing the atmosphere with an inert gas, the mixture was molten and mixed at 165° C. for 1 hour. Next, 0.02 part by weight of tin octanoate was added thereto as an esterifying catalyst and the resultant mixture was reacted for 6 hours. No deactivator was added thereafter. After the completion of the polymerization reaction, the obtained polymer was heated with a single screw extruder and devolatized under reduced pressure (5 Torr) for 120 seconds at 200° C. The lactic acid-based polymer (B) thus obtained was a colorless and transparent resin having a weight-average molecular weight of 195,000, a glass transition temperature (Tg) of 57° C. and no melting point (Tm). This resin was referred to as P12.

(Resin P13)

95 parts by weight of lactide (95% by mol of L-lactide with 5% by mol of D-lactide) was added to 5 parts by weight of a polyester containing aromatic carboxylic acids and aliphatic dicarboxylic acids [weight-average molecular weight: 47,000 (in terms of polystyrene), 16% by mol of terephthalic acid, 14% by mol of isophthalic acid, 20% by mol of adipic acid, 23% by mol of ethylene glycol with 27% by mol of neopentyl glycol]. After replacing the atmosphere with an inert gas, the mixture was molten and mixed at 165° C. for 1 hour. Next, 0.02 part by weight of tin octanoate was added thereto as an esterifying catalyst and the resultant mixture was reacted for 6 hours. After the completion of the polymerization reaction, residual monomers and oligomers were eliminated by the reprecipitation method with the use of tetrahydrofuran as a solvent and methanol as a poor solvent, without adding no deactivator. The lactic acid-based polymer (B) thus obtained was a colorless and transparent resin having a weight-average molecular weight of 195,000, a glass transition temperature (Tg) of 57° C. and no melting point (Tm). This resin was referred to as P13.

(Resin P14)

50 parts by weight of lactide (93% by mol of L-lactide with 7% by mol of D-lactide) was added to 50 parts by weight of an aliphatic polyester [weight-average molecular weight: 75,000 (in terms of polystyrene), 50% by mol of sebacic acid with 50% by mol of ethylene glycol]. After replacing the atmosphere with an inert gas, the mixture was mixed at 165° C. for 1 hour. Next, 0.02 part by weight of tin octanoate was added thereto as an esterifying catalyst and the resultant mixture was reacted for 8 hours. After adding 0.04 part by weight of acidic phosphate as a deactivator, the mixture was kneaded. The lactic acid-based polymer (B) thus obtained was a colorless and transparent resin having a weight-average molecular weight of 81,000 (determined by GPC), a glass transition temperature (Tg) of 46° C. and no melting point (Tm). This resin was referred to as P14.

Examples 1 to 5

By using each lactic acid-based polymer (A) as listed in Table 1 as the base layer (I) having a thickness of 20 μm and each amorphous lactic acid-based polymer (B) as the sealing layer (II) having a thickness of 15 μm, a laminate film of 35 μm in thickness was formed by extrusion film-forming with the use of a coextruder (manufactured by Tanabe Plastics Machinery Co., Ltd.). Then this film was thermoset in an air oven at 100° C. for 10 minutes. The laminate film thus obtained was evaluated by the following methods.

(1) Measurement of sealing strength

The sealing layers of two laminate films obtained above were located face to face, each as a sealing face, and heat-sealed with a heat-sealer (manufactured by Tester Sangyo). Then a 180° peeling test was carried out by using a tensile tester (manufactured by Shimadzu Corporation). Thus the adhesion strength of the heat-sealing was measured as the sealing strength.

Table 1 shows the results.

Sealing conditions:

seal bar temperature: 60–140° C., sealing pressure 2 kgf/cm$^2$, sealing time: 1 sec, seal bar size: 10×300 mm.

Measurement of sealing strength: in accordance with JIS-Z-1707.

(2) Evaluation of heat resistance (i) Practical test

Each laminate film obtained above was cut into pieces (20×20 cm). A weight (300 g) was placed at the center of a test piece and then wrapped therein followed by connected 4 corners together to give a simple test bag. These test bags were hung in air ovens at 60° C. and 80° C. with the connected corners upward. At the starting point, the length of each test bag was 13.5 cm. After 20 minutes, the effects of the weight on the film were observed and evaluation was made according to the following criteria: ○: showing no remarkable change (i.e., not more than 14 cm in length); ×: showing remarkable elongation and deformation (i.e., longer than 15 cm in length) or having been broken with the drop of the weight; and Δ: showing intermediate conditions. Table 1 shows the results.

(ii) Measurement of storage modulus (E')

In accordance with JIS-K-7198 (Method A), the minimum storage modulus (E') was determined at the temperature lower by 20° C. than the melting point of the crystallized lactic acid-based polymer (A). Table 1 shows the results.

(3) Haze value

Determined in accordance with JIS-K-7105. Table 1 shows the results.

(4) Melting point of resin

Determined in accordance with JIS-K-7121. Table 1 shows the results.

(5) Softening point of resin

Determined in accordance with JIS-K-7206. Table 1 shows the results.

(6) Evaluation of biodegradability 5 kg of garbage was put into an outdoor compost (capacity: 100 l) and a test piece (10×10 cm) of each laminate film obtained above was placed thereon. Further, additional garbage was put thereon to give a thickness of about 5 cm. After 1 month, the conditions of the test piece was evaluated with the naked eye. This test was performed in summer. The evaluation was effected according to the following criteria: ○: showing considerable deterioration in properties and scarcely sustaining the shape; Δ: suffering from deformation and whitening but sustaining the shape; and ×: sustaining the initial conditions without showing any whitening, deformation, etc.

Each of these laminate films showed a sealing initiation temperature of about 80° C. and maintained a good sealing strength (1,000 gf/15 mm or above) at a temperature of 90° C. or higher. In the heat resistance test with the use of weights, these films were well tolerable to temperatures of 60° C. and 80° C. The minimum storage modulus (E') of each laminate film was 900 kgf/cm$^2$ or above. The lactic acid-based polymer laminates produced above were excellent in transparency and biodegradability.

Examples 6 and 7

By using each lactic acid-based polymer (A) as listed in Table 1 as the base layer (I) having a thickness of 20 μm and each amorphous lactic acid-based polymer (B) as the sealing layer (II) having a thickness of 15 μm, a laminate film of 35 μm in thickness was formed by extrusion film-forming with the use of a coextruder (manufactured by Tanabe Plastics Machinery Co., Ltd.). Then this film was thermoset in an air oven at 100° C. for 10 minutes. The laminate film thus obtained was evaluated by the following methods.

(1) Measurement of sealing strength

Each of the base layer and the sealing layers of two laminate films obtained above were set face to face, and heat-sealed with a heat-sealer (manufactured by Tester Sangyo) Then a 180° peeling test was carried out by using a tensile tester (manufactured by Shimadzu Corporation). Thus the adhesion strength of the heat-sealing was measured as the sealing strength. Table 1 shows the results.

Sealing conditions:
    seal bar temperature: 60–140° C.,
    sealing pressure: 2 kgf/cm²,
    sealing time: 1 sec,
    seal bar size: 10×300 mm.
Measurement of sealing strength: in accordance with JIS-Z-1707.
(2) Evaluation of heat resistance
    The procedures of Examples 1 to 5 were repeated. Table 1 shows the results.
(3) Haze value
    Determined in accordance with JIS-K-7105. Table 1 shows the results.
(4) Melting point of resin
    Determined in accordance with JIS-K-7121. Table 1 shows the results.
(5) Softening point of resin
    Determined in accordance with JIS-K-7206. Table 1 shows the results.
(6) Evaluation of biodegradability
    The procedures of Examples 1 to 5 were repeated. Table 1 shows the results.

Each of these laminate films showed a good sealing strength (about 160 to 180 gf/15 mm) at a temperature of 90° C. or higher. In the heat resistance test with the use of weights, these films showed no trouble at 60° C. and 80° C. The minimum storage modulus (E') of each laminate film was 900 kgf/cm² or above. The lactic acid-based polymer laminates produced above were excellent in transparency and biodegradability.

Examples 8 and 9

By using each lactic acid-based polymer (A) as listed in Tables 1 and 2 as the base layer (I) having a thickness of 80 μm and each amorphous lactic acid-based polymer (B) as the sealing layer (II) having a thickness of 60 μm, a laminate film of 140 μm in thickness was formed by extrusion film-forming with the use of a coextruder (manufactured by Tanabe Plastics Machinery Co., Ltd.). Next, the obtained film was oriented by using a biaxial stretching machine (manufactured by Iwamoto Seisakusho) (stretching temperature: 65° C., preheating time: 5 minutes, stretching speed: 100%/min, stretching ratio: 2×2 (length×width), draw ratio: 43 to give an oriented film of 35 μm in thickness. Then this film was fixed in a frame and thermoset in an air oven at 100° C. for 20 seconds.

The sealing strength of the obtained laminate film was measured. Also, its heat resistance, haze value and biodegradability were evaluated each by the same method as the one employed in Examples 1 to 5. Tables 1 and 2 show the results.

Each of these laminate films showed a sealing initiation temperature of about 80° C. and maintained a good sealing strength (1,000 gf/15 mm or above) at a temperature of 100° C. or higher.

In the heat resistance test with the use of weights, the film of Example 8 showed no trouble at 60° C. and 80° C., while the film of Example 9 showed some elongation at 80° C. The minimum storage modulus (E') of the laminate film of Example 8 was 900 kgf/cm² while that of the film of Example 9 was 600 kgf/cm². The films obtained above were excellent in transparency and biodegradability.

Example 10

By using the lactic acid-based polymer (A) as listed in Table 2 as the base layer (I) and the amorphous lactic acid-based polymer (B) as the sealing layer (II), two single-layer films each having a thickness of 25 μm were formed by extrusion film-forming with the use of an extruder (manufactured by Tanabe Plastics Machinery Co., Ltd.). Next, the single-layer film made of the lactic acid-based polymer (A) alone was thermoset in an air oven at 100° C. for 10 minutes. Then a 30% solution of gelatin was applied to one face of each of these single-layer films which were then adhered to each other under pressure of 2 kgf/cm² followed by drying. Thus, a laminate film with good appearance was obtained. The sealing strength, heat resistance, haze value and biodegradability of the laminate film thus obtained were evaluated each by the same method as the one employed in Examples 1 to 5. Table 2 shows the results.

The laminate film showed a sealing initiation temperature of about 80° C. and maintained a good sealing strength (1,000 gf/15 mm or above) at a temperature of 90° C. or higher. In the heat resistance test with the use of weights, this film showed no trouble at 60° C. and 80° C. The minimum storage modulus (E') of the laminate film exceeded 900 kgf/cm² (i.e., 1100 kgf/cm²). The film obtained above was excellent in transparency and biodegradability.

Example 11

By using the lactic acid-based polymer (A) as listed in Table 2 as the base layer (I) and the amorphous lactic acid-based polymer (B) as the sealing layer (II), the sealing layers (II) (15 μm) were formed on the both faces of the base layer (I) (20 μm) by extrusion film-forming with the use of a coextruder (manufactured by Tanabe Plastics Machinery Co., Ltd.) to thereby give a laminate film of 50 μm in thickness. Next, this film was thermoset in an air oven at 100° C. for 10 minutes. The sealing strength, heat resistance, haze value and biodegradability of the laminate film thus obtained were evaluated each by the same method as the one employed in Examples 1 to 5. Table 2 shows the results.

The laminate film showed a sealing initiation temperature of about 80° C. and maintained a good sealing strength (1,000 gf/15 mm or above) at a temperature of 90° C. or higher. In the heat resistance test with the use of weights, this film showed no trouble at 60° C. but some elongation at 80° C. The minimum storage modulus (E') of the laminate film exceeded 780 kgf/cm². The film obtained above was excellent in transparency and biodegradability.

Example 12

By using the lactic acid-based polymer (A) as listed in Table 2 as the base layer (I) having a thickness of 20 μm and the amorphous lactic acid-based polymer (B) as the sealing layer (II) having a thickness of 15 μm, a laminate film of 35 μm in thickness was formed by extrusion film-forming with the use of a coextruder (manufactured by Tanabe Plastics Machinery Co., Ltd.). Then this film was thermoset in an air oven at 100° C. for 10 minutes. Next, an end of the obtained laminate film was folded with the sealing layer inside to form the bottom of a packaging bag. Then the folded part was heat-sealed at both sides with a heat-sealer (manufactured by Tester Sangyo) to give a heat-sealed packaging bag (20×20 cm) with an opening at one end. The bag thus formed had good appearance and high sealing strength at the two sealed ends. Sealing conditions: seal bar temperature: 90° C., sealing pressure: 2 kgf/cm², sealing time: 1 sec. (Seal bar size: 10×300 mm).

To evaluate the heat resistance, a weight (300 g) was put into the packaging bags formed above and then the bags were hung in air ovens at 60° C. and 80° C. At the starting point, the length of each test bag was about 20 cm. After 20 minutes, the bags were observed and evaluated in heat resistance in accordance to the following criteria: ○: showing no remarkable change (i.e., not more than 21 cm in length); ×: showing remarkable elongation and deformation (i.e., longer than 22 cm in length) or having been broken with the drop of the weight; and Δ: showing intermediate conditions. As a result, the bags showed neither any deformation nor breakage.

The haze value of the obtained film was evaluated by the same method as the one employed in Examples 1 to 5. Table 2 shows the results. The biodegradability was evaluated by the same method as the one employed in Examples 1 to 5 with the use of the packaging bag packed with garbage as a test sample. As a result, a good biodegradability was observed.

Example 13

By using the lactic acid-based polymer (A) as listed in Table 2 as the base layer (I) having a thickness of 20 μm and the amorphous lactic acid-based polymer (B) as the sealing layer (II) having a thickness of 15 μm, a laminate film of 35 μm in thickness was formed by extrusion film-forming with the use of a coextruder (manufactured by Tanabe Plastics Machinery Co., Ltd.). Then this film was thermoset in an air oven at 100° C. for 10 minutes. Next, an end of the obtained laminate film was folded with the sealing layer inside to form the bottom of a packaging bag. Then the folded part was fused at both sides to give a packaging bag (20×20 cm) with an opening at one end. The bag thus formed had good appearance and high sealing strength at the two sealed ends. Sealing conditions: seal bar temperature: 300° C.

The haze value of the obtained film was evaluated by the same method as the one employed in Examples 1 to 5. Table 2 shows the results.

To evaluate the heat resistance, the procedure of Example 12 was repeated. As a result, the bags showed neither any deformation nor breakage at 60° C. and 80° C. The biodegradability was evaluated by the same method as the one employed in Example 12. As a result, a good biodegradability was observed.

Example 14

By using the lactic acid-based polymer (A) as listed in Table 2 as the base layer (I) having a thickness of 20 μm and the amorphous lactic acid-based polymer (B) as the sealing layer (II) having a thickness of 15 μm, a laminate film of 35 μm in thickness was formed by extrusion film-forming with the use of a coextruder (manufactured by Tanabe Plastics Machinery Co., Ltd.). Then this film was thermoset in an air oven at 100° C. for 10 minutes. Next, an end of the obtained laminate film was folded with the sealing layer inside to form the bottom of a packagingbag. Then the folded part was impulse-sealed at both sides to give a packaging bag (20×20 cm) with an opening at one end.

The bag thus formed had good appearance and high sealing strength at the two sealed ends. Sealing was performed by using Polysealer manufactured by Fuji. To evaluate the heat resistance, the procedure of Example 12 was repeated. As a result, the bags showed neither any deformation nor breakage at 60° C. and 80° C. The biodegradability was evaluated by the same method as the one employed in Example 12. As a result, a good biodegradability was observed.

Example 15

By using the lactic acid-based polymer (A) as listed in Table 2 as the base layer (I) having a thickness of 100 μm and the amorphous lactic acid-based polymer (B) as the sealing layer (II) having a thickness of 15 μm, a laminate film of 115 μm in thickness was formed by extrusion film-forming with the use of a coextruder (manufactured by Tanabe Plastics Machinery Co., Ltd.). Then this film was thermoset in an air oven at 100° C. for 10 minutes. A laminate case obtained by using the sealing layer inside was shaped into a cylinder and heat-sealed at both ends to give the side wall of a cylindrical case. This cylindrical case was 10 cm in height and 5 cm in diameter. The sealed part of the obtained side wall of the case had good appearance and a high sealing strength.

Sealing conditions: seal bar temperature: 90° C., sealing pressure: 2 kgf/cm², sealing time: 1 sec.

To evaluate the heat resistance, the cylindrical cases thus formed were located vertically in air ovens at 60° C. and 80° C. After 20 minutes, these cases showed neither any shrinkage nor deformation. The biodegradability was evaluated by the same method as the one employed in Examples 1 to 5 with the use of the case packed with garbage as a test sample. As a result, a good biodegradability was observed.

Example 16

By using the lactic acid-based polymer (A) as listed in Table 2 as the base layer (I) having a thickness of 250 μm and the amorphous lactic acid-based polymer (B) as the sealing layer (II) having a thickness of 15 μm, a laminate sheet for vacuum forming of 265 μm in thickness was formed by extrusion film-forming with the use of a coextruder (manufactured by Tanabe Plastics Machinery Co., Ltd.). Further, a laminate film of 35 μm in thickness for sealing consisting of the base layer (I) (20 μm) and the sealing layer (II) (15 μm) was formed by extrusion film-forming. Then this film was thermoset in an air oven at 100° C. for 10 minutes.

The sheet obtained above was vacuum-formed into a lightweight container by using a cavity mold in the form of a cup having an opening of 55 mm in diameter and the depth of 20 mm with the sealing layer inside. The flange of the molded article corresponding to the seal part was 3 mm in width.

Vacuum forming conditions: heater temperature: 400° C., heating time: 10 sec., mold temperature: 80° C., forming time: 30 sec.

To evaluate the heat resistance, the cups obtained above were located in air ovens at 60° C. and 80° C. After 20 minutes, the products showed neither any shrinkage nor deformation at 60° C. but some deformation at 80° C. Evaluation of appearance (○: good, ×: shrunk, and Δ: somewhat deformed). Next, the cup and the sealing film were heat-sealed by using an Autocup Sealer (manufactured by Sunrise System) at a sealing temperature of 90° C. under a sealing pressure of 2 kgf/cm² for 1 second. The sealing layers of the cup and film respectively served as the sealing faces. The lightweight container thus sealed showed a high sealing strength and good appearance in the sealed part.

The biodegradability was evaluated by the same method as the one employed in Examples 1 to 5 with the use of the lightweight container packed with garbage as a test sample. As a result, a good biodegradability was observed.

Examples 17 and 18

By using each lactic acid-based polymer (A) as listed in Table 3 as the base layer (I) having a thickness of 20 μm and each amorphous lactic acid-based polymer (B) as the sealing layer (II) having a thickness of 15 μm, a laminate film of 35 μm in thickness was formed by extrusion film-forming with the use of a coextruder (manufactured by Tanabe Plastics Machinery Co., Ltd.). Then this film was thermoset in an air oven at 100° C. for 10 minutes. The laminate film thus obtained was evaluated in sealing strength, heat resistance, haze value and biodegradability respectively by the same methods as those employed in Examples 1 to 5. Table 3 shows the results.

The laminate films showed each sealing initiation temperature of about 80° C. and maintained a good sealing strength (500 gf/15 mm or above) at a temperature of 90° C. or higher. In the heat resistance test with the use of weights, these films showed no trouble at 60° C. and 80° C. The minimum storage modulus (E') of the laminate film of Example 17 was 1300 kgf/cm² while that of Example 18 was 1100 kgf/cm². These films were excellent in transparency and biodegradability. In Tables 1 to 4, the sealing temperature was given beside the sealing strength in each case.

Examples 19 and 20

By using each lactic acid-based polymer (A) as listed in Table 3 as the base layer (I) having a thickness of 20 μm and each amorphous lactic acid-based polymer (B) as the sealing layer (II) having a thickness of 15 μm, a laminate film of 35 μm in thickness was formed by extrusion film-forming with the use of a coextruder (manufactured by Tanabe Plastics Machinery Co., Ltd.). Then this film was thermoset in an air oven at 100° C. for 10 minutes. The laminate film thus obtained was evaluated in sealing strength, heat resistance, haze value and biodegradability respectively by the same methods as those employed in Examples 1 to 5. Table 3 shows the results.

The laminate films each showed sealing initiation temperature of about 80° C. and maintained a good sealing strength (1 kgf/15 mm or above) at a temperature of 90° C. or higher. In the heat resistance test with the use of weights, these films showed no trouble at 60° C. and 80° C. The minimum storage modulus (E') of each laminate film was 1100 kgf/cm². These films were excellent in transparency and biodegradability. In Tables 1 to 4, the sealing temperature was given beside the sealing strength in each case.

Example 21

By using the lactic acid-based polymer (A) as listed in Table 3 as the base layer (I) having a thickness of 20 μm and the amorphous lactic acid-based polymer (B) as the sealing layer (II) having a thickness of 15 μm, a laminate film of 35 μm in thickness was formed by extrusion film-forming with the use of a coextruder (manufactured by Tanabe Plastics Machinery Co., Ltd.). Then this film was thermoset in an air oven at 100° C. for 10 minutes. The laminate film thus obtained was evaluated in sealing strength, heat resistance, haze value and biodegradability respectively by the same methods as those employed in Examples 1 to 5. Table 3 shows the results.

The laminate films showed sealing initiation temperature of about 80° C. and maintained a good sealing strength (1 kgf/15 mm or above) at a temperature of 90° C. or higher. In the heat resistance test with the use of weights, these films showed no trouble at 60° C. and 80° C. The minimum storage modulus (E') of each laminate film was 1300 kgf/cm². This film was excellent in transparency and biodegradability. In Tables 1 to 4, the sealing temperature was given beside the sealing strength.

TABLE 1

| Example | | | 1 | 2 | 3 | 4 | 5 | 6 | 7 | 8 |
|---|---|---|---|---|---|---|---|---|---|---|
| Lactic acid-based polymer (A) | | | P1 | P2 | P3 | P4 | P5 | P3 | P4 | P1 |
| Melting point (° C.) | | | 163 | 176 | 168 | 162 | 162 | 163 | 162 | 163 |
| Crystallizing point (° C.) | | | 110 | 110 | 108 | 93 | 73 | 108 | 93 | 110 |
| Lactic acid-based polymer (B) | | | P6 | P7 | P8 | P9 | P9 | P8 | P9 | P8 |
| Softening point | | | 52 | 52 | 46 | 57 | 57 | 46 | 57 | 46 |
| Thickness (μm) | | | 35 | 35 | 35 | 35 | 35 | 35 | 35 | 35 |
| Haze value (%) | | | 13 | 18 | 10 | 19 | 14 | 10 | 19 | 1.0 |
| Heat | Practical | 60° C. | ○ | ○ | ○ | ○ | ○ | ○ | ○ | ○ |
| resistance | test | 80° C. | ○ | ○ | ○ | ○ | ○ | ○ | ○ | ○ |
| | E' (kgf/cm²) | | 1300 | 1500 | 1300 | 1100 | 1000 | 1300 | 1100 | 900 |
| Biodegradability | | | ○ | ○ | ○ | ○ | ○ | ○ | ○ | ○ |
| Sealing | 80° C. | | 80 | 70 | 30 | 500 | 500 | 10 | 10 | 0 |
| strength | 90° C. | | 1400 | 1350 | 1400 | 1450 | 1350 | 170 | 160 | 300 |
| (gf/15 mm) | 100° C. | | 1700 | 1750 | 1600 | 1600 | 1650 | 180 | 170 | 1400 |
| | 120° C. | | 2000 | 1900 | 1900 | 1650 | 1650 | 180 | 170 | 1550 |
| | 140° C. | | 2000 | 1900 | 2000 | 1650 | 1700 | 180 | 170 | 1700 |

TABLE 2

| Example | | | 9 | 10 | 11 | 12 | 13 | 14 | 15 | 16 |
|---|---|---|---|---|---|---|---|---|---|---|
| Lactic acid-based polymer (A) | | | P5 | P4 | P1 | P2 | P3 | P4 | P2 | P3 |
| Melting point (° C.) | | | 162 | 162 | 163 | 176 | 168 | 162 | 176 | 168 |
| Crystallizing point (° C.) | | | 73 | 93 | 110 | 110 | 108 | 93 | 110 | 108 |
| Lactic acid-based polymer (B) | | | P9 | P9 | P6 | P7 | P8 | P9 | P7 | P8 |
| Softening point | | | 57 | 57 | 52 | 52 | 46 | 57 | 52 | 46 |
| Thickness (μm) | | | 35 | 50 | 35 | 35 | 35 | 35 | — | — |
| Haze value (%) | | | 1.1 | 15 | 18 | 18 | 10 | 21 | — | — |
| Heat | Practical | 60° C. | ○ | ○ | ○ | ○ | ○ | ○ | ○ | ○ |
| resistance | test | 80° C. | Δ | ○ | Δ | ○ | ○ | ○ | ○ | Δ |
| | E' (kgf/cm²) | | 600 | 1100 | 780 | 1500 | 1300 | 1100 | 1500 | — |
| Biodegradability | | | ○ | ○ | ○ | ○ | ○ | ○ | ○ | ○ |

TABLE 2-continued

| Example | | 9 | 10 | 11 | 12 | 13 | 14 | 15 | 16 |
|---|---|---|---|---|---|---|---|---|---|
| Sealing | 80° C. | 0 | 400 | 80 | | | | | |
| strength | 90° C. | 600 | 1350 | 1400 | | | | | |
| (gf/15 mm) | 100° C. | 1650 | 1900 | 1700 | | | | | |
| | 120° C. | 1900 | 2300 | 2000 | | | | | |
| | 140° C. | 1900 | 2350 | 2000 | | | | | |

TABLE 3

| Example | | | 17 | 18 | 19 | 20 | 21 |
|---|---|---|---|---|---|---|---|
| Lactic acid-based polymer (A) | | | P1 | P4 | P4 | P4 | P3 |
| Melting point (° C.) | | | 163 | 162 | 162 | 162 | 168 |
| Crystallizing point (° C.) | | | 110 | 93 | 93 | 93 | 108 |
| Lactic acid-based polymer (B) | | | P10 | P11 | P12 | P13 | P14 |
| Softening point | | | 52 | 57 | 57 | 57 | 46 |
| Thickness (μm) | | | 35 | 35 | 35 | 35 | 35 |
| Haze value (%) | | | 13 | 19 | 19 | 19 | 10 |
| Heat | Practical | 60° C. | ○ | ○ | ○ | ○ | ○ |
| resistance | test | 80° C. | ○ | ○ | ○ | ○ | ○ |
| | E' (kgf/cm²) | | 1300 | 1100 | 1100 | 1100 | 1300 |
| Biodegradability | | | ○ | ○ | ○ | ○ | ○ |
| Sealing | 80° C. | | 40 | 200 | 500 | 500 | 30 |
| strength | 90° C. | | 600 | 700 | 1450 | 1450 | 1400 |
| (gf/15 mm) | 100° C. | | 800 | 800 | 1600 | 1600 | 1600 |
| | 120° C. | | 1000 | 800 | 1650 | 1650 | 1900 |
| | 140° C. | | 1000 | 800 | 1650 | 1650 | 2000 |

Comparative Examples 1 and 2

By using the amorphous lactic acid-based polymer (B) as listed in Table 4 as the base layer (I) having a thickness of 20 μm and the lactic acid-based polymer (A) as the sealing layer (II) having a thickness of 15 μm, a laminate film of 35 μm in thickness was formed by extrusion film-forming with the use of a coextruder (manufactured by Tanabe Plastics Machinery Co., Ltd.). Then this film was thermoset in an air oven at 100° C. for 10 minutes. The laminate film thus obtained was evaluated in sealing strength, heat resistance, haze value and biodegradability respectively by the same methods as those employed in Examples 1 to 5. Table 4 shows the results. In the heat resistance test with the use of weights, these films showed no trouble at 60° C. and 80° C. The minimum storage modulus (E') of each laminate film was 900 kgf/cm² or more. No sealing strength was achieved.

Comparative Examples 3 and 4

By using each amorphous lactic acid-based polymer (B) as listed in Table 4 as the base layer (I) having a thickness of 80 μm and each lactic acid-based polymer (A) as the sealing layer (II) having a thickness of 60 μm, a laminate film of 140 μm in thickness was formed by extrusion film-forming. Next, the obtained film was oriented by using a biaxial stretching machine (manufactured by Iwamoto Seisakusho) [stretching temperature: 65° C., preheating time: 5 minutes, stretching speed: 100%/min, stretching ratio: 2×2 (length×width), draw ratio: 4] to give an oriented film of 35 μm in thickness. Then this film was fixed in a frame (30×30 cm) and thermoset in an air oven at 100° C. for 20 seconds. The laminate film thus obtained was evaluated in sealing strength, heat resistance, haze value and biodegradability respectively by the same methods as those employed in Examples 1 to 5. Table 4 shows the results.

In the heat resistance test with the use of weights, each showed no trouble at 60° C. but some elongation at 80° C. The minimum storage modulus (E') of the laminate film of Comparative Example 3 was 600 kgf/cm² while that of the film of Comparative Example 4 was 500 kgf/cm². However, no sealing strength was achieved in each case.

Comparative Example 5

By using the amorphous lactic acid-based polymer (B) as listed in Table 4 as the base layer (I) and the lactic acid-based polymer (A) as the sealing layer (II), two single-layer films each having a thickness of 25 μm were formed by extrusion film-forming with the use of an extruder (manufactured by Tanabe Plastics Machinery Co., Ltd.). Next, the single-layer film made of the lactic acid-based polymer (B) alone was thermoset in an air oven at 100° C. for 10 minutes. Then a 30% solution of gelatin was applied to one face of each of these single-layer films which were then adhered to each other under pressure of 2 kgf/cm² followed by drying.

Thus, a laminate film (about 50 μm in thickness) with good appearance was obtained. The laminate film thus obtained was evaluated in sealing strength, heat resistance, haze value and biodegradability respectively by the same methods as those employed in Examples 1 to 5. Table 4 shows the results. In the heat resistance test with the use of weights, this film was remarkably deformed due to elongation at 60° C. and 80° C. The minimum storage modulus (E') of the laminate film was 1100 kgf/cm², i.e., more than 900 kgf/cm². However no sealing strength was achieved.

Comparative Example 6

By using the amorphous lactic acid-based polymer (A) as listed in Table 4 as the base layer (I) having a thickness of 20 μm and the amorphous lactic acid-based polymer (B) as the sealing layer (II) having a thickness of 15 μm, a laminate film of 35 μm in thickness was formed by extrusion film-forming with the use of a coextruder (manufactured by Tanabe Plastics Machinery Co., Ltd.). Then this film was not thermoset but immediately evaluated in heat resistance and haze value respectively by the same methods as those employed in Examples 1 to 5. Table 4 shows the results. In the heat resistance test with the use of weights, this film was broken at 60° C. and 80° C. The minimum storage modulus (E') of the laminate film was 0 kgf/cm², thus showing no heat resistance.

Comparative Example 7

By using the lactic acid-based polymer (A) as listed in Table 4, a single-layer film having a thickness of 35 μm was formed by extrusion film-forming with the use of an extruder (manufactured by Tanabe Plastics Machinery Co., Ltd.). Next, this film was thermoset in an air oven at 100° C. for 10 minutes. Then it was evaluated in sealing strength, heat resistance and haze value respectively by the same methods as those employed in Examples 1 to 5. Table 4 shows the results. As a result, no heat sealing strength was achieved.

Comparative Example 8

By using the amorphous lactic acid-based polymer (B) as listed in Table 4, a single-layer film having a thickness of 35 gm was formed by extrusion film-forming with the use of an extruder (manufactured by Tanabe Plastics Machinery Co., Ltd.). Next, this film was thermoset in an air oven at 100° C. for 10 minutes. Then it was evaluated in sealing strength, heat resistance and haze value respectively by the same methods as those employed in Examples 1 to 5. Table 4 shows the results. In the heat resistance test with the use of weights, this film was broken at 60° C. and 80° C. The minimum storage modulus (E') of the laminate film was 0 kgf/cm$^2$, thus showing no heat resistance.

TABLE 4

| Comparative Example | | | 1 | 2 | 3 | 4 | 5 | 6 | 7 | 8 |
|---|---|---|---|---|---|---|---|---|---|---|
| Lactic acid-based polymer (A) | | | P1 | P3 | P2 | P5 | P4 | P1 | P2 | — |
| Melting point (° C.) | | | 163 | 168 | 176 | 162 | 162 | 163 | 176 | — |
| Crystallizing point (° C.) | | | 110 | 108 | 110 | 73 | 93 | 110 | 110 | — |
| Lactic acid-based polymer (B) | | | P6 | P8 | P7 | P9 | P9 | P7 | — | P8 |
| Softening point | | | 52 | 46 | 52 | 57 | 57 | 52 | — | 46 |
| Thickness (μm) | | | 35 | 35 | 35 | 35 | 50 | 35 | 35 | 35 |
| Haze value (%) | | | 5 | 7 | 1.0 | 1.1 | 9 | 13 | 15 | 10 |
| Heat | Practical | 60° C. | ○ | ○ | ○ | ○ | x | x | ○ | x |
| resistance | test | 80° C. | ○ | ○ | Δ | Δ | x | x | ○ | x |
| | E' (kgf/cm$^2$) | | 1000 | 1100 | 600 | 500 | 300 | 0 | 2600 | 0 |
| Biodegradability | | | ○ | ○ | ○ | ○ | ○ | ○ | ○ | ○ |
| Sealing | 80° C. | | 0 | 0 | 0 | 0 | 0 | — | 0 | — |
| strength | 90° C. | | 0 | 0 | 0 | 0 | 0 | — | 0 | — |
| (gf/15 mm) | 100° C. | | 0 | 0 | 0 | 0 | 0 | — | 0 | — |
| | 120° C. | | 0 | 0 | 0 | 0 | 0 | — | 0 | — |
| | 140° C. | | 0 | 0 | 0 | 0 | 0 | — | 0 | — |

The present invention can provide lactic acid-based polymer laminates having high heat resistance of 60° C. or above, excellent sealing strength and good biodegradability and, therefore, being useful in various films, sheets, packaging containers, etc.

While the invention has been described in detail and with reference to specific embodiments thereof, it will be apparent to one skilled in the art that various changed and modifications can be made therein without departing from the spirit and scope thereof.

What is claimed is:

1. A heat-sealable lactic acid-based polymer laminate comprising a base layer (I) made of a crystallized lactic acid-based polymer (A) which has a melting point of at least 120° C., and a heat-sealing layer (II) made of an amorphous lactic acid-based polymer (B) which has a softening point of from 40 to 110° C., wherein one face of said heat-sealing layer is laminated to one face of said base layer, and the other face of said heat-sealing layer constitutes an outer face of said laminate.

2. The lactic acid-based polymer laminate as claimed in claim 1, wherein said lactic acid-based polymer (A) is a lactic acid-based polymer containing from 3 to 60% by weight of a polyester structural unit formed by dehydrating/condensing a dicarboxylic acid with a diol and/or a polyether structural unit formed by dehydrating/condensing a dicarboxylic acid with a polyether polyol.

3. The lactic acid-based polymer laminate as claimed in claim 1, wherein said lactic acid-based polymer (A) is a lactic acid-based polymer having a lactic acid component content of 40% by weight or more.

4. The lactic acid-based polymer laminate as claimed in claim 1, wherein said lactic acid-based polymer (A) is polylactic acid.

5. The lactic acid-based polymer as claimed in claim 1, wherein said lactic acid-based polymer (B) is a lactic acid-based polymer having a softening point of from 40 to 110° C.

6. The lactic acid-based polymer laminate as claimed in claim 1, wherein said lactic acid-based polymer (A) and/or said lactic acid-based polymer (B) comprise lactic acid-based polymer(s) obtained by deactivating a polymerization catalyst with a polymerization catalyst deactivator and/or lactic acid-based polymer(s) obtained by reducing the residual monomers by devolatilization and/or reprecipitation.

7. The lactic acid-based polymer laminate as claimed in claim 1, wherein said lactic acid-based polymer (A) and/or said lactic acid-based polymer (B) comprise lactic acid-based polymer(s) obtained by deactivating a polymerization catalyst with a polymerization catalyst deactivator and/or lactic acid-based polymer(s) obtained by reducing the residual monomers by devolatilization and/or reprecipitation.

8. The lactic acid-based polymer laminate as claimed in claim 1, wherein said base layer (I) made of said lactic acid-based polymer (A) is one having been crystallized by thermosetting.

9. The lactic acid-based polymer laminate as claimed in claim 1, wherein said base layer (I) made of said lactic acid-based polymer (A) is one having been oriented by stretching at a draw ratio of from 1.4 to 16.

10. The lactic acid-based polymer laminate as claimed in claim 1, which has a minimum storage modulus (E') of from 404 to 40,000 kgf/cm$^2$ at a temperature lower by 20° C. than its melting point as measured by the test on the temperature dependency of dynamic viscoelasticity according to standard method JIS-K-7198, Method A.

11. A film or sheet comprising the lactic acid-based polymer laminates as in claim 1.

12. A packaging container comprising the lactic acid-based polymer laminate as in claim 1.

13. The lactic-acid based polymer laminate as claimed in claim 1, further comprising a second heat-sealing layer (II) made of an amorphous lactic acid-based polymer (B) which has a softening point of from 40 to 110° C. laminated to the other face of said base layer.

* * * * *